US008068176B2

United States Patent
Pletz-Kirsch et al.

(10) Patent No.: US 8,068,176 B2
(45) Date of Patent: Nov. 29, 2011

(54) NOISE ELIMINATION DEVICE FOR THE DETECTION OF THE VERTICAL SYNC PULSE IN VIDEO SIGNALS

(75) Inventors: Gerhard Pletz-Kirsch, Norderstedt (DE); Siegfried Boehme, Hamburg (DE); Hartmut Hackmann, Hamburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1358 days.

(21) Appl. No.: 11/631,207

(22) PCT Filed: Jun. 30, 2005

(86) PCT No.: PCT/IB2005/052184
§ 371 (c)(1),
(2), (4) Date: Dec. 29, 2006

(87) PCT Pub. No.: WO2006/003633
PCT Pub. Date: Jan. 12, 2006

(65) Prior Publication Data
US 2009/0190032 A1    Jul. 30, 2009

(30) Foreign Application Priority Data
Jul. 2, 2004    (EP) .................................. 04103132

(51) Int. Cl.
*H04N 9/78* (2006.01)
(52) U.S. Cl. ........................................... 348/533
(58) Field of Classification Search .................. 348/533, 348/536, 537, 547, 534, 535, 725; 360/51; 327/105; 331/17, 18
See application file for complete search history.

(56) References Cited

U.S. PATENT DOCUMENTS

| 5,144,433 | A  | * | 9/1992  | Pletz-Kirsch et al. | ........ 348/533 |
| 5,596,372 | A  |   | 1/1997  | Berman et al. |  |
| 5,608,462 | A  |   | 3/1997  | Maas |  |
| 6,057,791 | A  | * | 5/2000  | Knapp | .......... 341/122 |
| 6,122,124 | A  | * | 9/2000  | Fasen et al. | ..................... 360/51 |
| 6,329,929 | B1 | * | 12/2001 | Weijand et al. | .......... 340/870.25 |
| 6,803,828 | B2 | * | 10/2004 | Tan et al. | ......................... 331/17 |
| 6,833,875 | B1 | * | 12/2004 | Yang et al. | ..................... 348/665 |
| 7,580,629 | B2 | * | 8/2009  | Fifer | ............................... 398/18 |
| 2003/0052997 | A1 | * | 3/2003 | Renner et al. | ................. 348/536 |
| 2003/0081149 | A1 |   | 5/2003 | Coste |  |
| 2004/0232951 | A1 | * | 11/2004 | Tan et al. | ...................... 327/105 |

FOREIGN PATENT DOCUMENTS
JP    6 30295    5/1994
* cited by examiner

*Primary Examiner* — Paulos Natnael
(74) *Attorney, Agent, or Firm* — DLA Piper

(57) ABSTRACT

In order to create a noise elimination device for the detection of the vertical sync pulse in video signals, which has a very fast locking behavior and in which additional components can be integrated easily, which components can measure fundamental parameters of the underlying composite video signal, it is proposed that the device comprises a vertical pulse detector (12), which detects successive vertical sync pulses in the composite video signal and a VPLL (vertical phase locked loop), which comprises at least a phase detector (18) that produces a phase error, at least a loop filter (20), at least an oscillator (16) on which the output signal of the vertical pulse detector is present as an input signal and which oscillator produces a clock signal phase-synchronized with the input signal, whereas the oscillator (16) is a counter which counts with an approximately constant clock frequency, while the length of an oscillation period of the oscillator (16) is determined by the change in its count due to a correction value produced by the loop filter.

9 Claims, 4 Drawing Sheets

Figure 1:
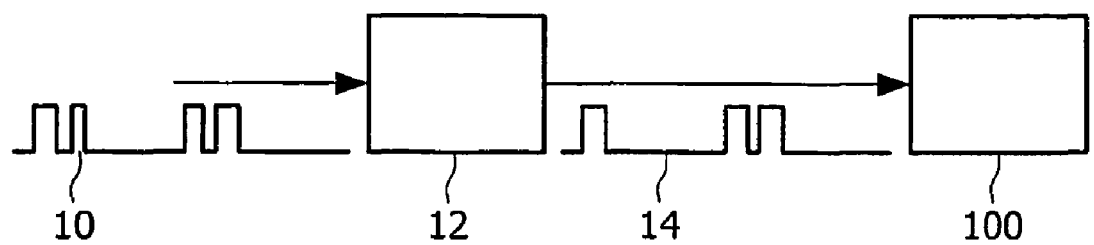

NOISE ELIMINATION DEVICE FOR THE DETECTION OF THE VERTICAL SYNC PULSE IN VIDEO SIGNALS

PRIORITY CLAIMS/RELATED APPLICATIONS

This application is a 35 USC §371 national stage filing of and claims priority under 35 USC §119 to PCT Patent Application No. PCT/IB05/52184 filed on Jun. 30, 2005 which in turn claims priority under 35 USC §119 to European Patent Application Serial No. 04103132.9 filed on Jul. 2, 2004.

The invention relates to a noise elimination device for the detection of the vertical sync pulse in video signals as mentioned in the pre-characterizing part of claim 1.

It is known that analog and digital video signals need precise timing for transmission of the image signal to a monitor. A horizontal sync pulse is set at the start of each line during the raster scanning. A vertical sync pulse is generated at the end of each complete field, which comprises 625 or 525 half lines at 50 or 60 Hz respectively, depending on the standard. Simultaneously, there is a comparatively long blanking period during which the beam generating the image is directed from the bottom of the screen back to the top of the screen, so that the raster scanning of the next field can begin. The synchronization information is thus used for resolving the horizontal and vertical deflection circuits at the right moment so that the deflection of the electron beam takes place properly and the desired image can be created on the monitor without distortion. The synchronization information is then generally derived from a composite video signal in which the horizontal and vertical sync pulses are separated from each other. The two types of sync pulses can then be differentiated on the basis of the different pulse durations.

A multiplicity of synchronization circuits is known from the state of the art, which circuits generate a suitable clock generator signal even if the input signals contain noise. Window-based noise elimination methods are used for this purpose, in which the noise pulses not occurring within periodically set windows are suppressed. Another method is the creation of phase-synchronization between input signal and the internal clock generator signal by using a PLL (phase locked loop).

U.S. Pat. No. 4,974,081 reveals a clock pulse generating circuit not affected by noise resulting from vertical equalizer pulses. It includes a PLL circuit for generating a clock pulse, which is phase-synchronized with the applied input signal. The circuit further includes a synchronization circuit for generating a window signal pulse synchronized with the horizontal synchronization signal. The synchronization condition is judged with respect to the composite synchronizing signal and a gate circuit allows passage of the signal pulse only in the period of time of a window signal. The effect of the phase synchronization relates here only to the horizontal sync pulses. Using a voltage-controlled oscillator (VCO) and a low pass filter as a loop filter necessitate the described system to need a certain number of periods before it locks on to the input signal.

Other similar circuits that use PLLs with a VCO for generating a clock generator pulse synchronized with the horizontal synchronization signal are known from U.S. Pat. Nos. 5,608,462 and 5,596,372. Furthermore, a vertical counter is provided in the latter publication, which counter has a clock frequency given by the line frequency. On the other hand, a counter whose count is corrected by the measured phase errors is used in US 2003/0081149 as an oscillator of the PLL. In this publication, too, the synchronization process is used on the horizontal signal. In order to determine the most likely position of a sync pulse, measured pulses are assessed in respect of their position and their width.

The use of a VPLL (vertical phase locked loop) for the suppression of noise signals in vertical sync pulses is known from JP 06030295.

It is an object of the invention to indicate a device for elimination of noise for the detection of the vertical sync pulse in video signals of the generic type, which device has a very rapid locking behavior and in which additional components, which can measure the basic parameters of the underlying composite video signal, can be integrated in a simple way.

As invented, this object is achieved by means of a noise elimination device for the detection of the vertical sync pulse in video signals with the features mentioned in claim 1. Such a device comprises a vertical pulse detector, which detects successive vertical sync pulses in the composite video signal and a VPLL (vertical phase locked loop), comprising at least a phase detector producing a phase error, at least a loop filter and at least an oscillator on which the output signal of the vertical pulse detector is present as an input signal and which produces a clock signal phase synchronized with the input signal.

The fact that the oscillator is a counter counting with an approximately constant clock frequency, where the length of an oscillation period of the oscillator is determined by the change in its count due to a correction value produced by the loop filter, is advantageous in achieving a very rapid locking behavior of the system by a suitable construction of the loop filter. Moreover, components can easily be integrated into the device, which components can measure parameters such as the fundamental frequency of the composite video signal and the length of a field by assessing the count in the event of the occurrence of a vertical sync pulse or the phase error measured then, as the case may be. A simple assessment of the counts then takes place in the case where the clock frequency of the oscillator is the half-line frequency of the composite video signal.

The phase detector in the preferred embodiment of the invention comprises a phase stroboscope, which measures the counts at which the vertical sync pulses occur and calculates phase errors from them, and a minimum finder that calculates the phase errors that have the lowest absolute value. This achieves that the pulse, which is most probably the sync pulse, is taken into consideration by the system while alleged noise pulses are ignored.

Especially preferred is that at the beginning of a new locking operation the first correction value is equal to the phase error measured during the first period and the second correction value is equal to double the phase error measured during the second period. This makes it possible to have a locking of the phase synchronization within only two fields in the event of an offset and a constant frequency shift of the input signal with respect to the clock frequency of the oscillator.

Another preferred embodiment of the invention provides that the device comprises means for detection of alternating field lengths and a window-based device for detection of vertical sync pulses in such a manner that in the event that alternating field lengths are detected, there is a switchover from the VPLL to the window-based device. This achieves that the device reaches synchronization of the clock signal also in what are called feature modes of video recorders.

Other preferred embodiments of the invention are obtained from the other features mentioned in the dependent claims.

Figure 2:
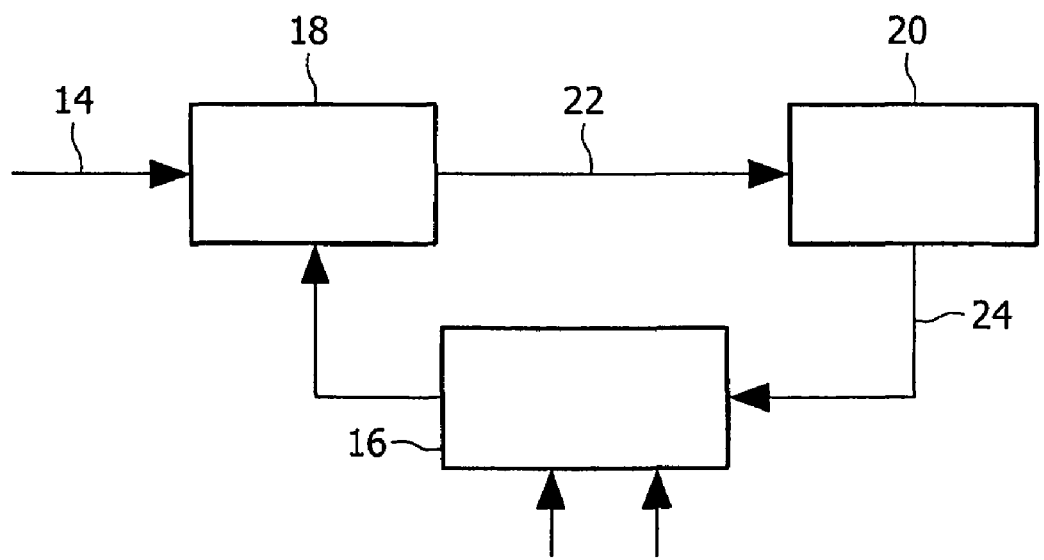
Figure 3:
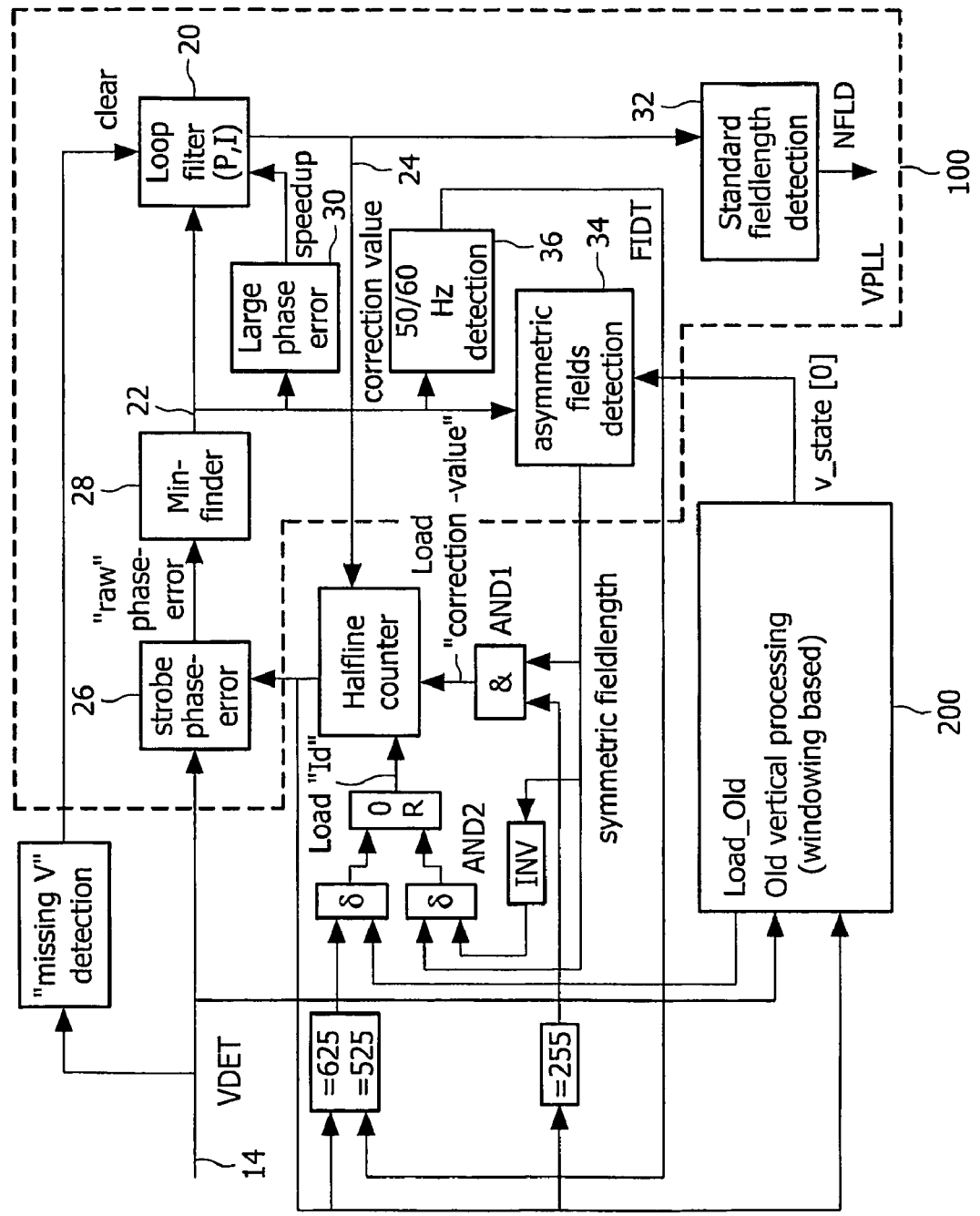
Figure 4:
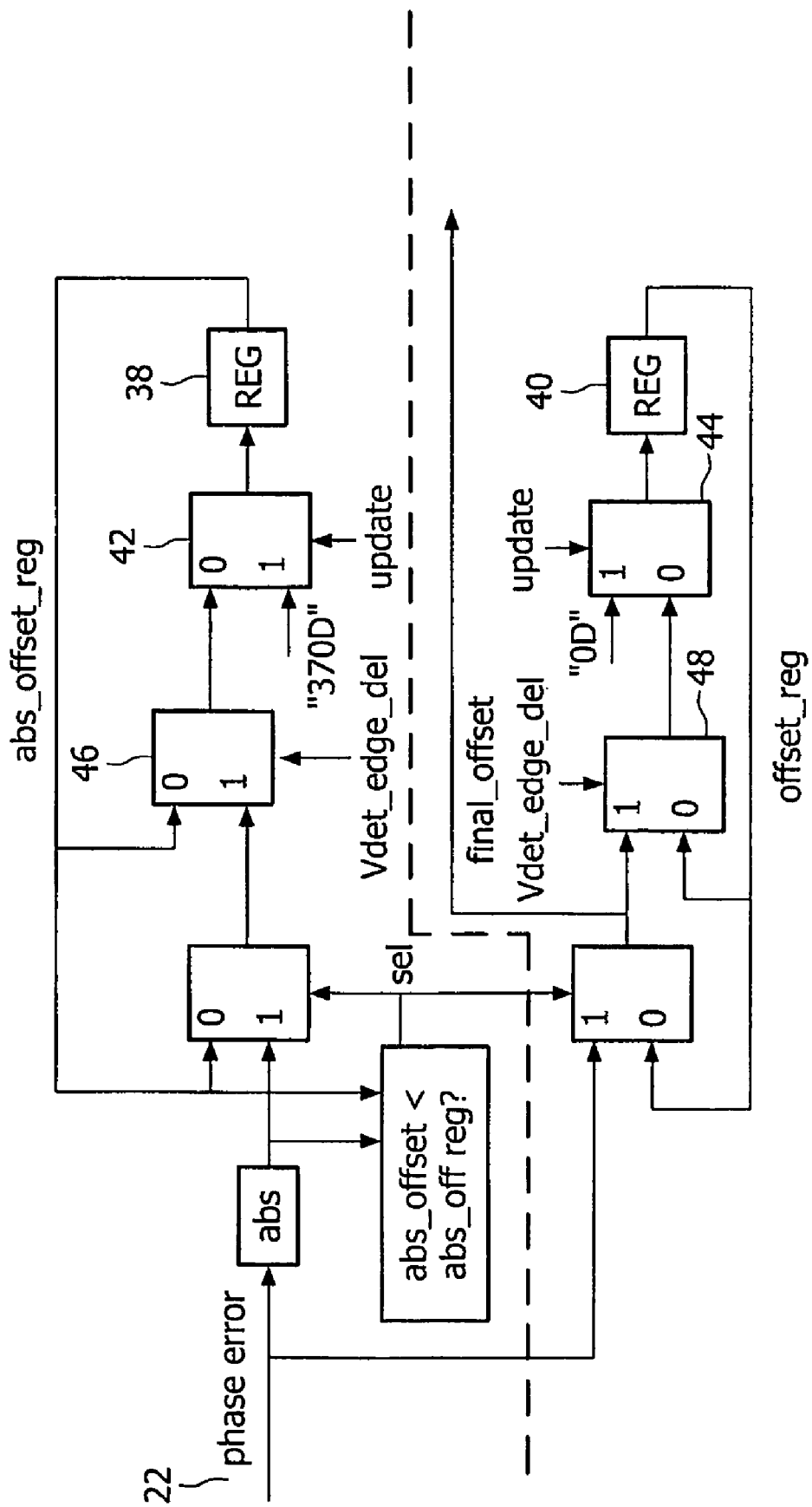
Figure 5:
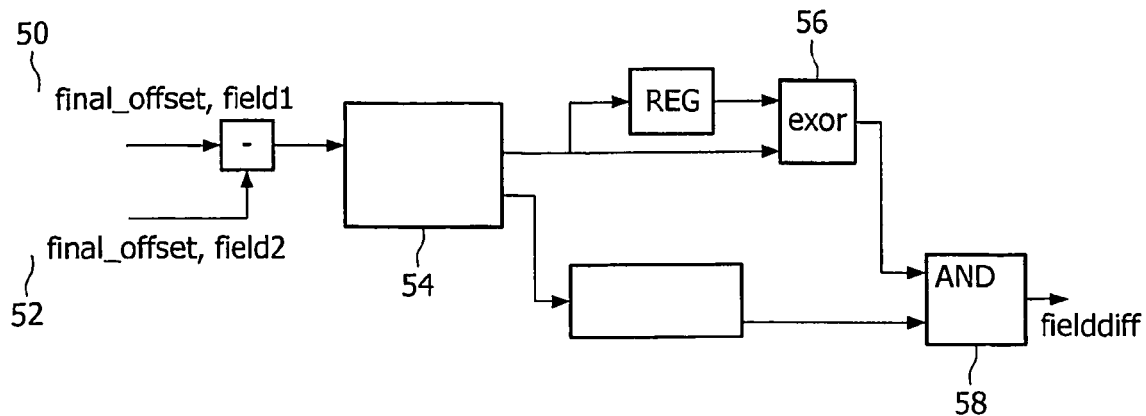
Figure 6:
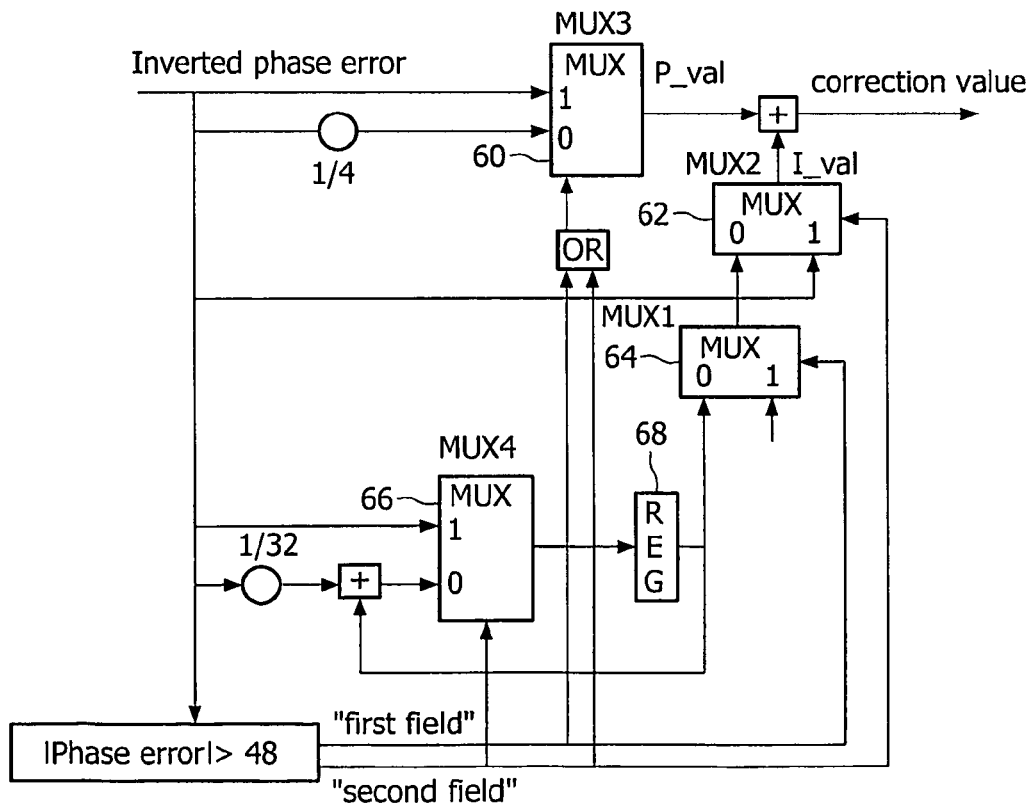

These and other aspects of the invention are apparent from and will be elucidated, by way of non-limitative example, with reference to the embodiment(s) described hereinafter. In the drawings, FIG. 1 gives a schematic representation of the input signal for the VPLL (vertical phase locked loop), FIG. 2 gives a schematic representation of the VPLL, FIG. 3 shows a block circuit diagram of the VPLL in combination with a window-based noise elimination system, FIG. 4 shows a block circuit diagram of the minimum finder, FIG. 5 shows a block circuit diagram of the asymmetrical field detector and FIG. 6 shows a block circuit diagram of the loop filter, FIG. 1 shows the input signal for the VPLL. A vertical synchronization signal 10 is fed to a V pulse detector 12. Noise pulses not exceeding a certain length are already suppressed in the V-pulse detector 12. Greater noise, on the other hand, remains in the input signal 14 for the VPLL referred to as 100. Noise factors influencing the input signal 14 are accordingly, on the one hand, all additional noise pulses not eliminated by the V-pulse detector 12 and, on the other, weak vertical sync pulses which are wrongly suppressed.

FIG. 2 shows the VPLL 100, which consists of an oscillator 16, a phase detector 18 and a loop filter 20, like any PLL. The oscillator 16 consists of an up-counter having a clock frequency corresponding to double the line frequency. The counter thus adds 1 after every half line. Depending on the standard (625 half lines at 50 Hz or 525 half lines at 60 Hz, as the case may be), the counter is reset to 1 at 625 or 525, respectively. The oscillator 16 thus oscillates with a period corresponding to a field and the fundamental frequency is 1/312.5, or 1/262.5 respectively of the line frequency. In contrast with a voltage-controlled oscillator (VCO), which is usually inserted in a PLL and with which the frequency is detuned, the counter is reset or put forward to a certain value in the present case. An increase in the frequency is effected, for example, by adding a certain number of half lines $\Delta n$ to the count during each period. The frequency of the oscillator would in this case change to $1/(312.5-\Delta n/2)$ or $1/(262.5-\Delta n/2)$ of the line frequency. When correcting the oscillator, the count should not fall below 0 and not exceed 525 or 625. The correction of the counter is done at about the middle of the oscillation period at a count of 256. The phase detector 18 stores the count with each rising edge of the input signal 14. For stored counts <256, the stored count is subtracted during the updating, otherwise the difference between the maximum value of the up-counter and the count is added during the updating. The phase error may thus lie in the range between −255 and 269 or 369, respectively.

The phase detector 18 has a minimum finder 28 as an additional component that calculates the most likely vertical sync pulse. A block circuit diagram for the minimum finder 28 is described below. The loop filter 20 is a low-pass filter that calculates a correction value for the oscillator 16 based on the current phase error and the phase errors measured in the previous periods. The exact way of operation of the loop filter 20 is described below.

FIG. 3 shows the combination of the VPLL 100 with a window-based noise elimination for vertical equalizer pulses. The input signal for the VPLL 14 runs through the phase stroboscope 26 to the minimum finder 28, where the phase error 22 is calculated. The loop filter 20 calculates a correction value 24 from the phase error 22, which correction value is used for the half-line counter 16 to adjust its oscillation frequency. Moreover, the correction value 24 can be easily assessed in the standard field length detector 32. If the correction value is 0, a 3-bit counter is incremented. A signal is set at a certain count, e.g. 7, which signal shows that the input signal has a standard field length, i.e. contains exactly 525 or 625 half lines per field, respectively. For a correction value different from 0, the counter is decremented and for a count of 0 the signal is reset again. This low pass behavior is necessary for a nominal field length to be detected even with standard signals heavily fraught with noise.

The phase error 22 is also assessed in three other components. The task for the detector for large phase errors 30 is to have the loop filter 20 undertake accelerated adjustment of the correction values in the event of phase errors exceeding a certain level. Furthermore, the asymmetrical field detector 34 can conclude when the signs of the phase errors are alternated systematically, that the input signal has correlated oscillating field lengths (see below). Finally, the phase error 22 in the 50/60 Hz detector 36 is used to differentiate between the 60 Hz mode (525 half lines) and the 50 Hz mode (625 half lines). If the VPLL runs in the 50 Hz mode, but counts systematically less than 577 half lines per field, it switches over to the 60 Hz mode. Similar to the standard field length detector 32, a counter is used here too, which works as a low-pass filter.

The half-line counter 16 is set to 1, as seen from the logical circuit diagrams in FIG. 3, depending on the state of the circuit decided by two different conditions. If the field lengths are asymmetrical and if the window-based noise elimination 200 has attained a sufficient noise-elimination mode, the half-line counter 16 is set to 1, if the window-based noise elimination 200 sets a loading signal. Otherwise, i.e. if the field lengths are asymmetrical or the window-based noise elimination 200 is situated in an unlocked noise elimination mode, the half-line counter 16 is set to 1, if it has reached its maximum value. The correction value 24 is loaded at a count of 255, if the field lengths are symmetrical or the window-based noise elimination 200 is in the unlocked noise elimination mode.

FIG. 4 shows a block circuit diagram for the minimum finder 28. It is an object of the minimum finder 28 to select from a plurality of measured phase errors 22 the one that has the lowest absolute value and thus effects the smallest possible frequency correction of the oscillator 16. It is assumed that the smallest possible frequency shift of the oscillator is the one that corresponds to the correct vertical sync pulse. The minimum finder 28 is subdivided into two circuits (indicated by the broken line in FIG. 4), which store the respective smallest absolute value of the phase error 22 (above the broken line) on the one hand and the associated phase error 22 (below the broken line) on the other. The respective values are stored in the registers 38 and 40. The updating multiplexers 42 and 44 ensure that the two registers 38 and 40 are loaded with suitable initial values at a count of 255. The register for the absolute value of the measured phase error 38 is loaded with 370, i.e. the value of the maximum phase error +1. The register for the measured phase error 40 is loaded with 0, i.e. the value that is supposed to be forwarded to the loop filter 20 when a measured vertical sync pulse fails to occur. On recognizing a pulse in the vertical pulse detector 12, the absolute value of the measured phase error is compared with the value stored in the register 38. If the absolute value of the measured phase error is smaller than that of the stored one, the registers 38, 40 are overwritten with the new values. To avoid synchronization problems, this is effected, however, with a one-clock pulse delay. This is achieved by having an output signal delayed by one clock pulse present on the multiplexers 46 and 48. Therefore, always the smallest measured phase error is passed on to the loop filter 20.

FIG. 5 shows a block circuit diagram for the asymmetrical field detector 34. It is an object of this circuit to recognize systematically alternating field lengths, which are generated partly by video recorders in what are called feature modes. In such an event, using VPLL 100 is not advisable, because the field lengths are determined by it and would cause a distinctly visible vertical jitter. The deviation of the length of two successive fields is only between 2 and 4 half lines in case of video recorder still pictures. The measured phase errors of field 1 and field 2, 50 and 52, are evaluated in the central data processor 54. If the difference value is between 0 and 12 half lines, the first condition for correlated oscillating field lengths is fulfilled. Moreover, the sign of the difference in field lengths is compared with the stored sign of the previous period. If these are different, the second condition is fulfilled and the EXOR circuit 56 passes on the corresponding result to the AND circuit 58. Only if both said criteria are fulfilled simultaneously will the AND circuit 58 set a corresponding signal "fielddiff".

FIG. 6 shows a block circuit diagram for the loop filter 20. An object of the loop filter 20 is to calculate a correction value 24, which is compiled from a component proportional to the measured phase error 22 and an integral component dependent on the previous phase error. To ensure a quickest possible locking time of the VPLL 100, a separate calculation of the correction value 24 is carried out when particularly major phase errors are measured. The acceleration of the locking time will be elucidated with the help of a concrete example. At the beginning of the transient of the oscillator 16, the starting points of the oscillation periods are generally not yet synchronized and would be shifted by Δn relative to each other, where Δn is greater than 48. The multiplexer 60, which determines the proportionality factors directly passes on the inverted phase error to the half-line counter as a correction value for two fields. The integral component does not make any contribution during the first field. In the absence of any frequency difference between input signal and VPLL, the locking operation is already terminated, because in the subsequent periods the measured phase errors as well as the correction value are 0. However, if there is a frequency difference, which is expressed by a phase error Δn', then the inverted phase error is fed to the integrator register 68. This is also fed to the adding element 70 as a contribution of the integral component via the multiplexers 64 and 62. The proportional component makes the same contribution via the multiplexer 60, so that the adding element 70 calculates a correction value of −2Δn'. As the phase error has grown to 2 Δn' with a constant frequency in the subsequent period, it is ensured when the oscillator 16 is adjusted with the correction value 24, that the immediately next vertical sync pulse and the beginning of a new loop period of the oscillator coincide exactly. The phase error disappears in the subsequent measurements and the correction value is only determined by the value stored in the integrator register 68, namely Δn'. The VPLL is locked from this point onwards. The system thus corrects a constant phase error during one field and an additional frequency difference within two fields. For correcting smaller fluctuations of the phase error, the phase errors are gradually added up via the switch 66 with an integral factor of 1/32 in the integrator register 68 and the correction value 24 is then compiled from the contribution of the integrator register 68 and the phase error weighted with 1/4.

LIST OF REFERENCE SIGNS:

100 VPLL (Vertical phase locked loop)
200 Window-based noise elimination
10 Composite video signal
12 vertical pulse detector
14 Input signal for VPLL
16 Oscillator/half-line counter
18 Phase detector
20 Loop filter
22 Phase error
24 Correction value
26 Phase stroboscope
28 Minimum finder
30 Detector for large phase errors
32 Standard field length detector/Means for detection of standard field lengths
34 Asymmetric fields detector/Means for detection of alternating field lengths
36 50/60 Hz detector/Means for detection of the fundamental frequency
38 Register for the absolute value of the measured phase error
40 Register for the measured phase error
42, 44 Updating multiplexer
46, 48 Multiplexers on which the output signal delayed by 1 clock is present
50 Measured phase error of field 1
52 Measured phase error of field 2
54 Central processor unit
56 EXOR circuit
58 AND circuit
60, 62, 64, 66 Multiplexer
68 Integrator register
70 Addition element of the proportional and integral part

The invention claimed is:

1. A noise elimination device for the detection of the vertical sync pulse in a composite video signal, comprising:
   a vertical pulse detector, which detects successive vertical sync pulses in the composite video signal;
   a vertical phase locked loop comprising at least a phase detector producing a phase error, at least a loop filter and at least an oscillator, on which the output signal of the vertical pulse detector is present as an input signal and which produces a clock signal phase-synchronized with the input signal; and
   wherein the oscillator is a counter which counts with an approximately constant clock frequency, while the length of an oscillation period of the oscillator is determined by the change in its count due to a correction value produced by the loop filter.

2. The device as claimed in claim 1, wherein the phase detector comprises a phase stroboscope which measures the counts at which the vertical sync pulses occur and calculates phase errors from them, and a minimum finder which calculates the phase error with the lowest absolute value.

3. The device as claimed in claim 1, wherein the loop filter comprises a proportional part which outputs a component proportional to the phase error and an integral part which outputs a component proportional to a value stored in an integrator register.

4. The device as claimed in claim 1, wherein at the beginning of a new locking procedure, the first correction value equals the phase error measured during the first period and the second correction value equals double the phase error measured during the second period.

5. The device as claimed in claim 1, wherein the clock frequency of the oscillator is the half-line frequency of the composite video signal.

6. The device as claimed in claim 1 wherein the change in the count takes place approximately at the middle of the period of the oscillator.

7. The device as claimed in claim 1 further comprising means for detection of alternating field lengths and a window-based device for detection of vertical sync pulses so that in the event that alternating field lengths are detected, there is a switchover from the vertical phase locked loop to the window-based device.

8. The device as claimed in claim 1 further comprising means for detection of the fundamental frequency of the composite video signal.

9. The device as claimed in claim 1 further comprising means for detection of standard field lengths.

* * * * *